(12) United States Patent
Roberts et al.

(10) Patent No.: US 9,332,602 B2
(45) Date of Patent: May 3, 2016

(54) LED DRIVER WITH TRANSFORMERLESS HYSTERETIC BOOST

(71) Applicant: General Electric Company, Schenectady, NY (US)

(72) Inventors: Bruce Richard Roberts, Mentor-on-the-Lake, OH (US); Shahzil Rana, St. Laurent (CA)

(73) Assignee: GENEREAL ELECTRIC COMPANY, Schenectady, NY (US)

( * ) Notice: Subject to any disclaimer, the term of this patent is extended or adjusted under 35 U.S.C. 154(b) by 169 days.

(21) Appl. No.: 14/104,034

(22) Filed: Dec. 12, 2013

(65) Prior Publication Data

US 2015/0173139 A1    Jun. 18, 2015

(51) Int. Cl.
 *H05B 33/08*    (2006.01)
(52) U.S. Cl.
 CPC ........... *H05B 33/0815* (2013.01); *Y02B 20/346* (2013.01)
(58) Field of Classification Search
 CPC .................................................. H04B 33/0815
 USPC .............. 315/185 R, 192, 247, 291, 294, 312
 See application file for complete search history.

(56) References Cited

U.S. PATENT DOCUMENTS

| | | | |
|---|---|---|---|
| 2012/0146544 A1* | 6/2012 | Sauerlaender | H05B 33/083 315/294 |
| 2012/0229044 A1* | 9/2012 | Nerone | H05B 33/0815 315/210 |
| 2012/0326508 A1* | 12/2012 | Roberts | H05B 33/083 307/36 |
| 2013/0015768 A1 | 1/2013 | Roberts et al. | |

OTHER PUBLICATIONS

Leon-Masich et al., "High Voltage LED Supply Using a Hysteretic Controlled Single Stage Boost Converter", Przeglad Elektrotechniczny (Electrical Review), R. 88, pp. 26-30, 2012.
Rong, "A high efficiency transformerless step-up DC—DC converter with high voltage gain for LED backlighting applications".
"A single-stage off-line LED driver IC with hysteretic power factor correction control".

* cited by examiner

*Primary Examiner* — Haissa Philogene
*Assistant Examiner* — Borna Alaeddini
(74) *Attorney, Agent, or Firm* — GE Global Patent Operation; Peter T. DiMauro

(57) ABSTRACT

A system and apparatus including a light emitting diode (LED) driver provides an operating DC voltage to a plurality of LEDs connected in series (LED array) for providing illumination. A rectifier circuit and a filter are coupled to an AC power supply and provide a rectified and filtered DC source voltage to a transformerless voltage boost circuit, which provides the operating DC voltage to the LED array. A hysteretic self-oscillating circuit drives the transformerless voltage boost circuit at an oscillation frequency. A tap is connected between two LEDs in the LED array, which provides an auxiliary DC voltage, which is used to power the oscillating circuit and which eliminates the need for the LED driver to have a conventional transformer or auxiliary DC-DC power converter. The transformerless voltage boost circuit includes an inductor, a capacitor, a diode, and a switch wherein the switch is controlled by the oscillating circuit.

20 Claims, 4 Drawing Sheets

LED DRIVER WITH TRANSFORMERLESS HYSTERETIC BOOST

I. FIELD OF THE INVENTION

The present invention relates generally to light emitting diode (LED) power supplies. More particularly, the present invention relates to an LED driver having a transformerless hysteretic boost circuit that uses regulated direct current (DC).

II. BACKGROUND OF THE INVENTION

Power converters are used in a variety of portable electronic devices, including laptops, mobile devices, cellular phones, electronic digital pads, video cameras, digitals cameras, and the like. In addition, power converters may be used in non-portable applications, such as liquid-crystal display (LCD) backlighting, automotive lighting, and other general purpose or specialty lighting.

Power converters come in many forms. Some converters are AC-DC converters, which convert an alternating current (AC) input voltage to a DC output voltage. A DC-DC converter typically converts one input DC input voltage to a different DC output voltage.

Conventional AC-DC power converters typically include a diode bridge rectifier stage (i.e., a bridge or full-wave rectifier) and a bulk storage capacitor. The incoming AC voltage is generally provided by an AC power supply or AC line, which is converted to a DC output voltage when run through the diode bridge rectifier and bulk storage capacitor. This DC voltage is typically further processed by a converter, which generates an output DC voltage that is applied across a load, such as an array of individual LEDs (i.e., "LED array").

Using LEDs for lighting applications is becoming more and more popular as the cost of LEDs drops due to manufacturing improvements. LED lighting often utilizes an LED array, such as a plurality of LEDs connected in series, to increase the amount of light output to a desired amount. Because LEDs typically operate from a DC voltage source, the AC voltage that is typically available as a power source needs to be converted to DC power in order to drive the LED array, and thus an LED driver is provided to manage and control the DC power supplied to the LED array.

Conventionally, an LED driver includes a flyback or boost DC-DC converter that receives, as an input, the rectified DC voltage output from the AC-DC converter and is then used to provide the suitable voltage and current, as an output from the DC-DC converter, to the LED load.

However, the voltage at which an LED array operates is often much higher than the operating voltage of other circuitry components within the LED driver or other components external to the LED driver. Including additional circuitry within the LED driver, to supply a range of voltages to operate both the LED array and other auxiliary components, increases the weight, complexity, and cost to the LED driver.

III. SUMMARY OF EMBODIMENTS OF THE INVENTION

Given the aforementioned deficiencies, a need exists for systems, methods, and devices providing a low cost, reduced weight, and reduced complexity LED driver. It is also desirable to provide proper DC voltages to the power and control circuitry of the LED driver while at the same time eliminating the need for a conventional transformer or auxiliary DC-DC power converter as part of the LED driver. Particularly, what are needed are systems, methods, and devices providing an LED driver having a transformerless hysteretic boost circuit that uses regulated DC voltage tapped from the LED array to power circuitry components of the LED driver.

One embodiment of the present invention includes an LED driver for providing an operating DC voltage to an LED array, the LED array including a plurality of LEDs connected in series for providing illumination, comprising a transformerless voltage boost circuit configured to receive a filtered DC source voltage and to provide the operating DC voltage to the LED array, a hysteretic self-oscillating circuit for driving the transformerless voltage boost circuit at an oscillation frequency, and a tap connected between two of the LEDs in the LED array for providing an auxiliary DC voltage to power the hysteretic self-oscillating circuit.

In the embodiment, the LED driver further includes, or is otherwise in electronic communication with, a rectifier circuit coupled to an AC power supply and configured to rectify the AC voltage from the AC power supply into a DC power source for providing a DC source voltage and a filter for filtering the DC source voltage and for outputting the filtered DC source voltage.

Another embodiment of the present invention provides an apparatus including an LED array including a plurality of LEDs connected in series for providing illumination, an LED driver including (i) a transformerless voltage boost circuit configured to receive a filtered DC source voltage and to provide an operating DC voltage to the LED array, and (ii) a hysteretic self-oscillating circuit for driving the transformerless voltage boost circuit at an oscillation frequency. Also included is a tap connected between two of the LEDs in the LED array for providing an auxiliary DC voltage to power the oscillating circuit of the LED driver.

In features of the above embodiments, the transformerless voltage boost circuit includes an inductor, a capacitor, a diode, and a switch. The transformerless voltage boost circuit does not include a transformer or a conventional auxiliary DC-DC converter. Preferably, the above switch is controlled (i.e., turned on or off) by the hysteretic self-oscillating circuit, which causes the current from the inductor to switch or transition between ground and the LED array.

In further features of the above embodiments, the switch is a transistor, such as a metal oxide semiconductor field effect transistor (MOSFET). Preferably, the hysteretic self-oscillating circuit includes an oscillator and a push-pull amplifier. Yet further, the oscillator preferably drives the transformerless voltage boost circuit through the push-pull amplifier.

In other features of the above embodiments, the auxiliary DC voltage tapped from within the LED array is less than the operating DC voltage applied across the entire LED array.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

Figure 3:
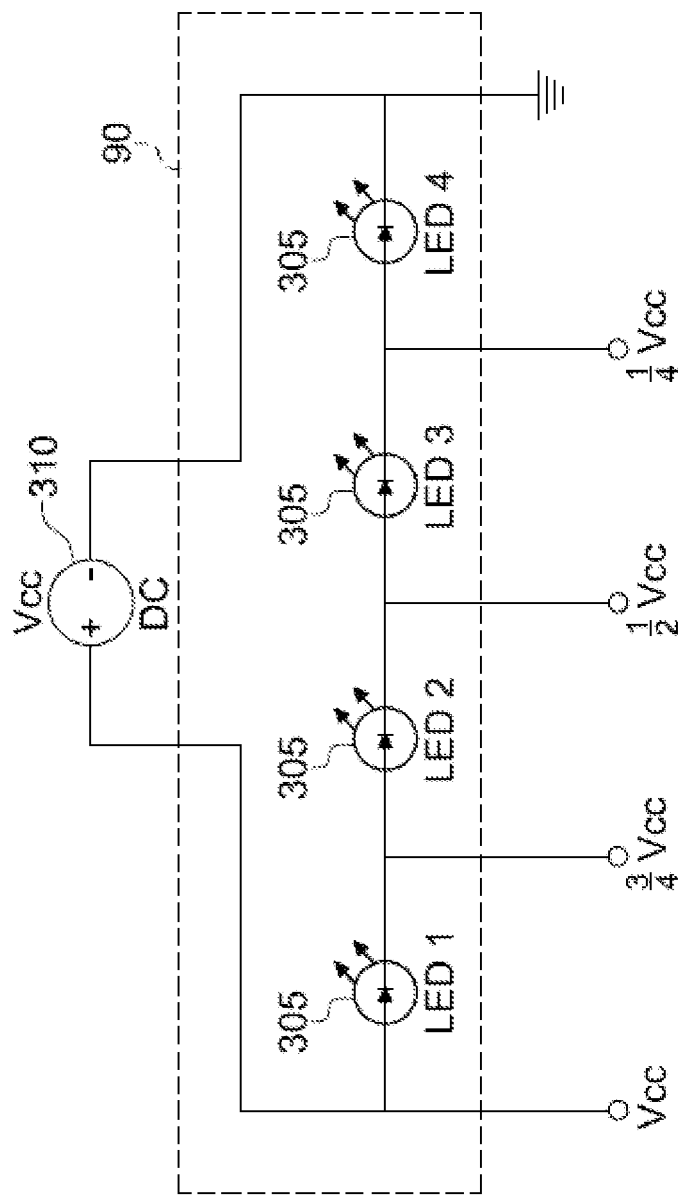
Figure 4:
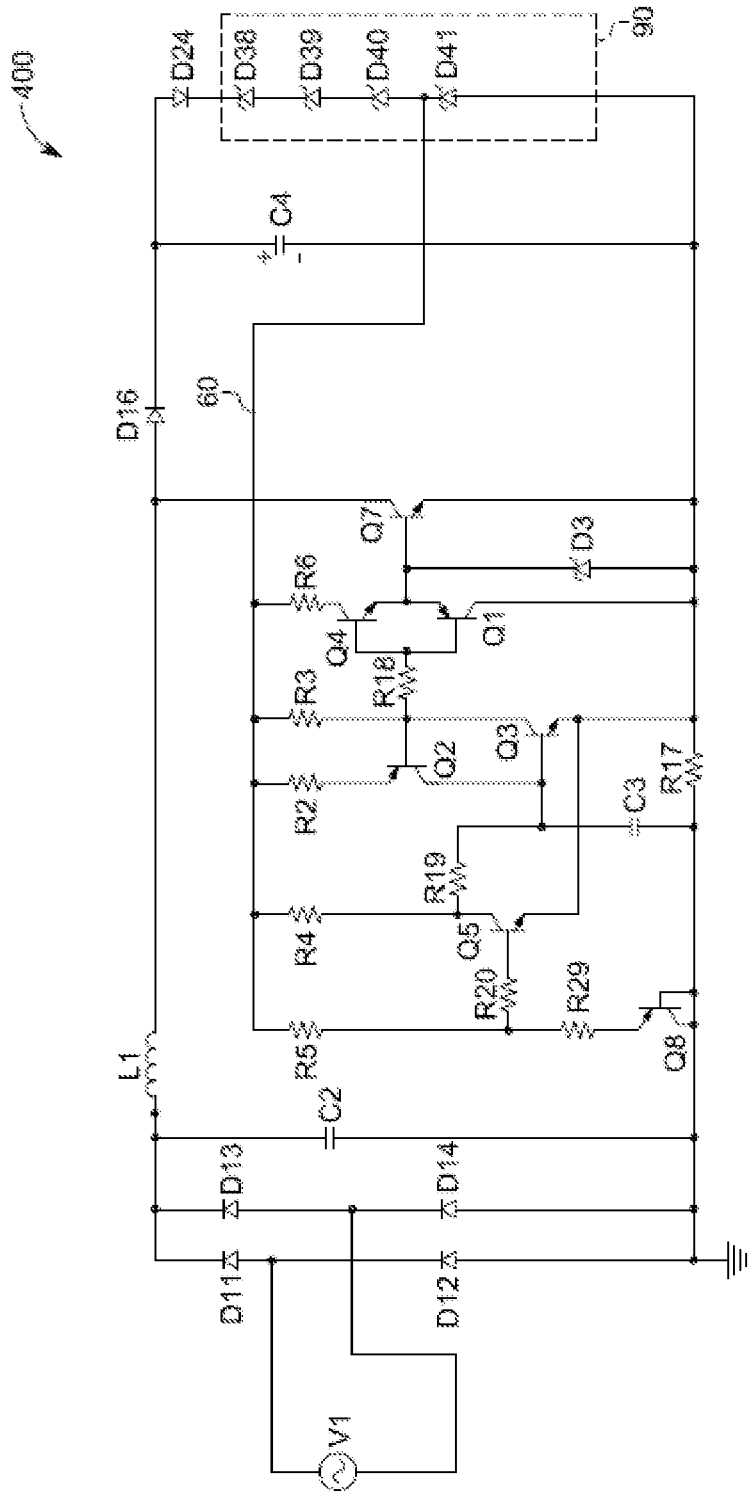

FIG. 3 shows a simplified schematic diagram illustrating the concept of tapping off a DC voltage from an exemplary LED array having uniform LEDs; and FIG. 4 shows a schematic diagram of an example LED driver driving an LED array with a tap feeding DC voltage back to the driver circuitry that does not include a conventional transformer or DC-DC power converter in accordance with embodiments of the present invention.

V. DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
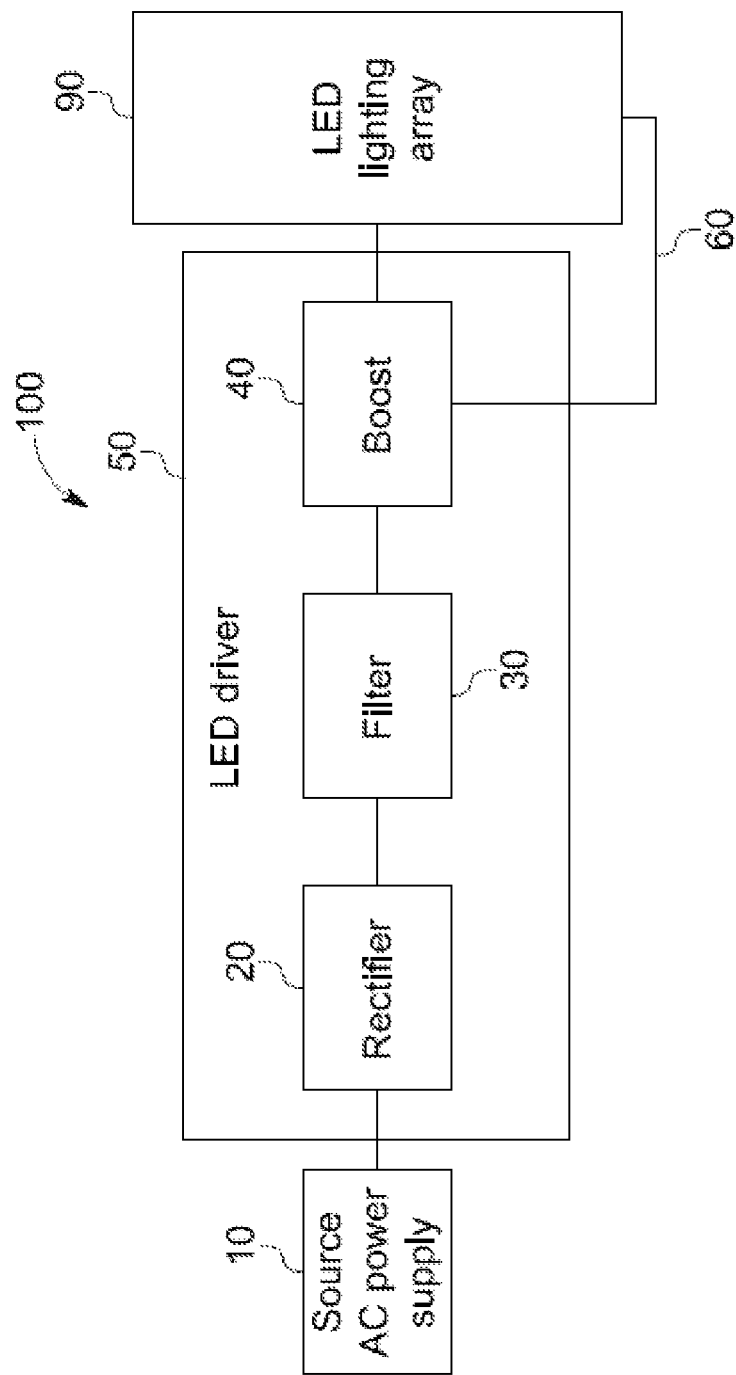
FIG. 1 shows a simplified block diagram of one example embodiment of the LED driver and LED array.

FIG. 1 is an example simplified block diagram showing the primary components of the system 100. The system 100 includes an LED driver 50 connected between an AC power supply 10 and a load, which, in this application, includes one or more LEDs configured as an LED lighting array 90 (hereinafter referred to as "the load," as "the LED load," or "the LED array").

The AC voltage and current from the AC power supply 10 runs first through a bridge or full-wave rectifier 20 and a high frequency input filter 30, which filters out high frequency noise and/or electromagnetic interference and prevents such noise or interference from being injected back into the bridge rectifier 20. Although shown as part of the LED driver 50, in some embodiments the bridge rectifier 20 and input filter 30 are separate components through which the AC power is supplied before reaching the main components of the LED driver 50.

The LED driver 50 includes a boost component (or boost circuitry) 40 for boosting the rectified and filtered power for providing a constant current to the LED lighting array 90. Preferably, at least one tap 60 is taken off of the LED lighting array 90 to provide regulated DC voltage back to one or more components of the boost circuitry 40, which eliminates the need for the LED driver 50 to have a conventional transformer or auxiliary DC-DC power converter.

Figure 2:
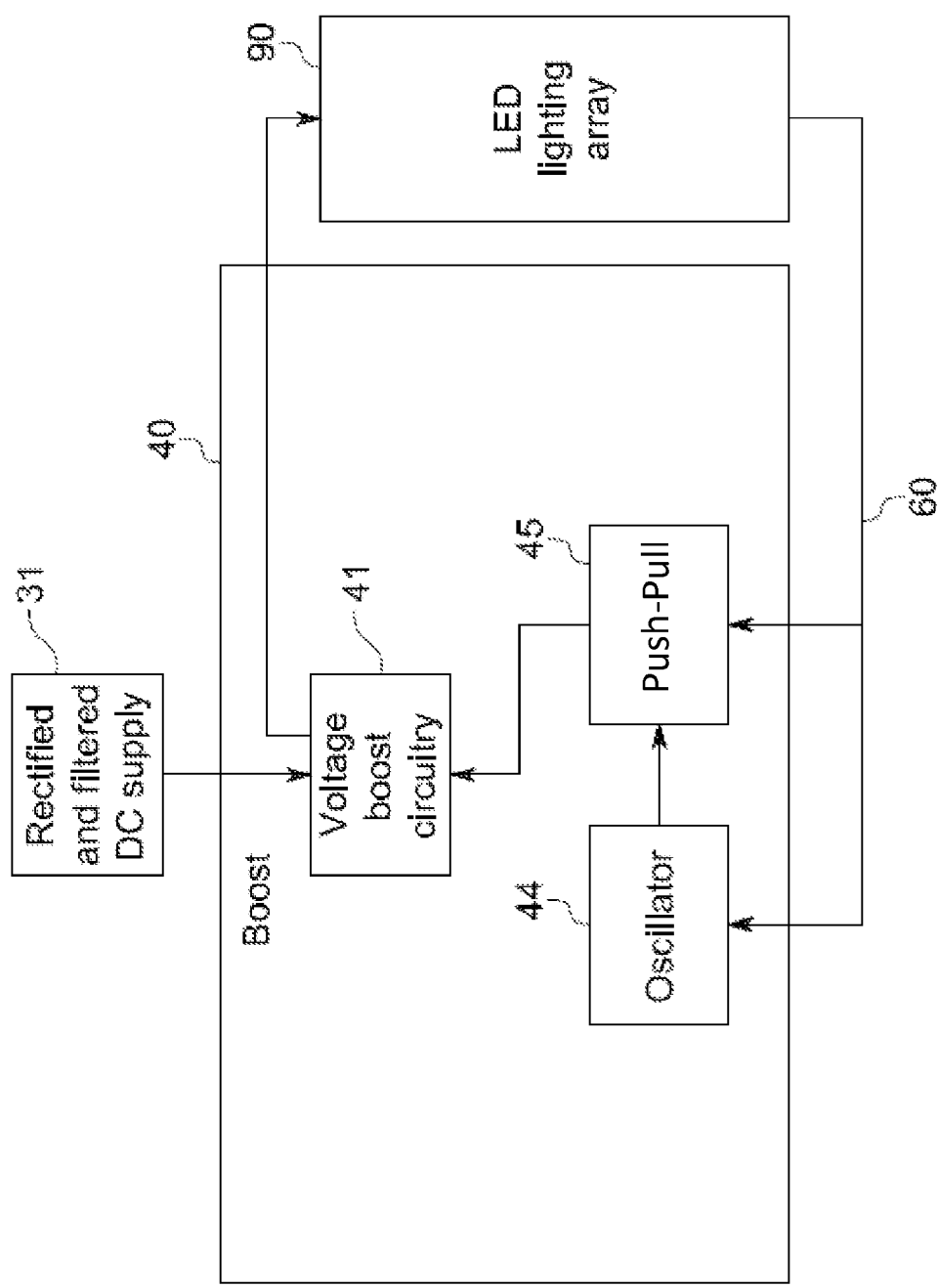
FIG. 2 shows a block diagram of an example embodiment of an example boost component of the LED driver.

FIG. 2 shows a block diagram of the boost component 40 of the example simplified system of FIG. 1 in more detail. The boost component 40 is comprised of voltage boost circuitry 41 for boosting the rectified and filtered DC power 31 and controlling the output current to the LED lighting array 90.

The boost circuitry 41 is further driven by an oscillator 44 through a push-pull amplifier 45. The amplifier 45 is used to isolate the oscillator 44 from the boost circuit 41 in order to avoid a large current drain from the boost circuit 41 that might otherwise affect the operation of the oscillator 44. The oscillator 44 and amplifier 45 are both powered by regulated DC voltage provided from the one tap 60 that is taken off of the LED lighting array 90.

FIG. 3 shows an example embodiment circuit 300 for tapping a simple LED lighting array 90, where a DC power supply 310 (such as may be provided by an array driver circuit, for example) provides a $V_{CC}$ voltage to a four (4) LED array using four identical LEDs 305. By adding taps between each of the LEDs 305, voltages of $V_{CC}$, three-quarters $V_{CC}$, one-half $V_{CC}$, and one-quarter $V_{CC}$ can be provided, where one-quarter $V_{CC}$ is the voltage drop across one of the LEDs 305.

Of course, more or fewer LEDs could be utilized in series depending on the illumination desired, and taps need not be placed regularly between all of the LEDs, as the taps are chosen based on the voltage needs of any auxiliary components to be powered. For example, if the input from the AC power supply 10 is 120 VAC RMS, the output $V_{CC}$ can be 200 VDC consisting of four 50V LEDS.

The bottom or last (in series) connected LED voltage, one-quarter $V_{CC}$, can be tapped and used as an auxiliary DC voltage in a feedback manner to power the hysteretic boost circuit 40. By doing so, circuits typically included in a conventional LED driver, such as a transformer or auxiliary DC-DC converter, are unnecessary. An inductor is still used, but can be smaller than conventional and can be a commercially-available component. This higher DC voltage used to operate the controller then drives the use of different components in the power and control circuits.

The hysteretic boost can be used to obtain a very power dense LED driver. Removing the requirement for a transformer or a separate auxiliary DC-DC converter circuit allows for an even higher power density. A commercial off-the-shelf inductor can then be used in place of a conventional transformer since the power supply functionality requirement has been eliminated. Very few parts are required to implement the auxiliary DC voltage since the power is derived from the LED lighting array itself.

The operating voltages of the oscillator circuit 44 are preferably configured to ensure enough headroom and the values of the oscillator resistances are chosen to accommodate the new operating point. The main switching component is preferably a transistor, such as a MOSFET, especially if a gate protection scheme is added. First choice as presented in this embodiment is the lower cost transistor approach.

FIG. 4 shows a schematic 400 of an example implementation of the LED driver of the present invention. The rectifier 20 is provided by bridge rectifier D1, with capacitor C1 provided as the input filter 30. The oscillating circuit 44 is comprised of switches Q2, Q3, and Q5 and with resistors R2, R3, R4, R5, R19, and R20. The oscillating circuit 44 oscillates based on the values of the components of the RC circuit comprised of resistor R17 and capacitor C3, which determine the oscillating frequency of the oscillating circuit 44. A push-pull amplifier 45 is provided by switches Q1 and Q4, which connects the oscillating circuit 44 to the boost circuit 41.

The boost circuit 41 is provided by inductor L1, diode D16, capacitor C4, and switch Q7. Basically, the oscillating circuit drives switch Q7 to switch on and off at the oscillating frequency, leading inductor L1 to charge when Q7 is "on," and forcing inductor L1 to discharge into the LED lighting array 90, while boosting the load voltage when Q7 is turned off. The LED lighting array 90, in this example, includes LEDs D38, D39, D40, and D41. The push-pull amplifier 45 prevents Q7 from drawing too much current from the oscillating circuit 44 during this switching operation, as drawing too much current could otherwise shut down the oscillation.

The oscillation circuit 44 and amplifier 45 are both powered by regulated DC voltage provided from the one tap 60 that is taken off of the LED lighting array 90, between LEDs D40 and D41.

CONCLUSION

As noted above, embodiments of the present invention include an LED driver for providing an operating DC voltage to an LED array, the LED array including a plurality of LEDs connected in series for providing illumination, comprising a transformerless voltage boost circuit configured to receive a filtered DC source voltage and to provide the operating DC voltage to the LED array, a hysteretic self-oscillating circuit for driving the transformerless voltage boost circuit at an oscillation frequency, and a tap connected between two of the LEDs in the LED array for providing an auxiliary DC voltage to power the oscillating circuit.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more, but not all, exemplary embodiments of the present invention as contemplated by the inventor(s), and thus, are not intended to limit the present invention and the appended claims in any way.

What is claimed is:

1. A light emitting diode (LED) driver for providing an operating direct current (DC) voltage to an LED array, the LED array including a plurality of LEDs connected in series for providing illumination, comprising:
   a transformerless voltage boost circuit configured to receive a filtered DC source voltage and to provide the operating DC voltage to the LED array;
   a hysteretic self-oscillating circuit for driving the transformerless voltage boost circuit at an oscillation frequency; and
   a tap connected between two of the plurality of LEDs in the LED array for providing an auxiliary DC voltage to the hysteretic self-oscillating circuit, wherein the auxiliary DC voltage is at least a part of the operating DC voltage provided to the LED array from the transformerless voltage boost circuit and the auxiliary DC voltage provided by the tap connected between the two of the plurality of LEDs in the LED array powers the hysteretic self-oscillating circuit for driving the transformerless voltage boost circuit at the oscillation frequency.

2. The LED driver of claim 1, wherein the transformerless voltage boost circuit is comprised of an inductor, a capacitor, a diode, and a switch.

3. The LED driver of claim 2, wherein the switch is controlled by the hysteretic self-oscillating circuit for switching current from the inductor between ground and the LED array.

4. The LED driver of claim 2, wherein the switch is a transistor.

5. The LED driver of claim 2, wherein the switch is a MOSFET.

6. The LED driver of claim 1, further comprising (i) a rectifier circuit coupled to an alternating current (AC) power supply and configured to rectify an AC voltage from the AC power supply into a DC power source for providing a DC source voltage and (ii) a filter for filtering the DC source voltage and for outputting the filtered DC source voltage.

7. The LED driver of claim 1, wherein the auxiliary DC voltage is less than the operating DC voltage.

8. The LED driver of claim 1, wherein the hysteretic self-oscillating circuit comprises an oscillator and a push-pull amplifier.

9. The LED driver of claim 8, wherein the oscillator drives the transformerless voltage boost circuit through the push-pull amplifier.

10. The LED driver of claim 1, wherein the transformerless voltage boost circuit is self-oscillating.

11. A method of providing an operating direct current (DC) voltage to a light emitting diode (LED) array using an LED driver, the LED array including a plurality of LEDs connected in series for providing illumination, the method comprising:
   receiving a filtered DC source voltage by a transformerless voltage boost circuit in the LED driver for providing the operating DC voltage to the LED array;
   driving the transformerless voltage boost circuit at an oscillation frequency by a hysteretic self-oscillating circuit in the LED driver; and
   providing an auxiliary DC voltage to the hysteretic self-oscillating circuit by connecting a tap between two of the plurality of LEDs in the LED array, wherein the auxiliary DC voltage is at least a part of the operating DC voltage provided to the LED array from the transformerless voltage boost circuit and the auxiliary DC voltage provided by the tap connected between the two of the plurality of LEDs in the LED array powers the hysteretic self-oscillating circuit for driving the transformerless voltage boost circuit at the oscillation frequency.

12. The method of claim 11, wherein the transformerless voltage boost circuit is comprised of an inductor, a capacitor, a diode, and a switch.

13. The method of claim 12, further comprising controlling the switch by the hysteretic self- oscillating circuit for switching current from the inductor between ground and the LED array.

14. The method of claim 12, wherein the switch is a transistor.

15. The method of claim 12, wherein the switch is a MOSFET.

16. The method of claim 11, further comprising (i) rectifying, by a rectifier circuit coupled to an alternating current (AC) power supply, an AC voltage from the AC power supply into a DC power source for providing a DC source voltage and (ii) filtering, by a filter, the DC source voltage and outputting the filtered DC source voltage.

17. The method of claim 11, wherein the auxiliary DC voltage is less than the operating DC voltage.

18. The method of claim 11, wherein the hysteretic self-oscillating circuit comprises an oscillator and a push-pull amplifier.

19. The method of claim 18, further comprising driving, by the oscillator, the transformerless voltage boost circuit through the push-pull amplifier.

20. The method of claim 11, wherein the transformerless voltage boost circuit is self-oscillating.

* * * * *